July 20, 1965 S. SCHWARTZ 3,195,732

PHONOGRAPH RECORD RACK STAND

Filed July 10, 1963 5 Sheets-Sheet 1

INVENTOR.

Sandor Schwartz

BY Polachek & Saulsbury

ATTORNEYS.

INVENTOR
Sandor Schwartz
BY Polachek & Saulsbury
ATTORNEYS.

INVENTOR.
Sandor Schwartz
BY Polachek & Saulsbury
ATTORNEYS.

July 20, 1965 S. SCHWARTZ 3,195,732

PHONOGRAPH RECORD RACK STAND

Filed July 10, 1963 5 Sheets-Sheet 4

INVENTOR
Sandor Schwartz
BY Polachek & Saulsbury
ATTORNEYS.

July 20, 1965 S. SCHWARTZ 3,195,732

PHONOGRAPH RECORD RACK STAND

Filed July 10, 1963

5 Sheets-Sheet 5

INVENTOR.

Sandor Schwartz

BY Polachek & Saulsbury

ATTORNEYS.

United States Patent Office 3,195,732
Patented July 20, 1965

3,195,732
PHONOGRAPH RECORD RACK STAND

Sandor Schwartz, 324 Empire Blvd., Brooklyn 25, N.Y.
Filed July 10, 1963, Ser. No. 294,130
1 Claim. (Cl. 211—40)

This invention relates to phonograph record racks for holding disk-shaped records.

Broadly, the invention concerns a rollable and portable rack or holder for disk-shaped records wherein the records are held in plain view of the observer.

In such racks, the subframe units for supporting the disk-shaped records are formed with inverted U-shaped bodies of springy metal hingedly and slidably mounted so that the subframe units are easily slid sidewise out of their journal bearings when the slightest pressure is brought to bear against them with the result that such subframe units with supported records get out of alignment making it difficult to withdraw the records and presenting an unpleasant appearance.

An important object of the present invention is to provide a rack or holder for disk-shaped records with means for preventing accidental displacement of the subframe units that support the records.

Another object is to provide a rack for safely supporting records of the disk type and for easily selecting the supported records.

A further object is to provide a rack for supporting records of the disk type and for supporting albums or books of records.

It is also an object of the invention to provide a phonograph record rack of this kind that is simple and rugged in construction, economical to manufacture and neat and attractive in appearance.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
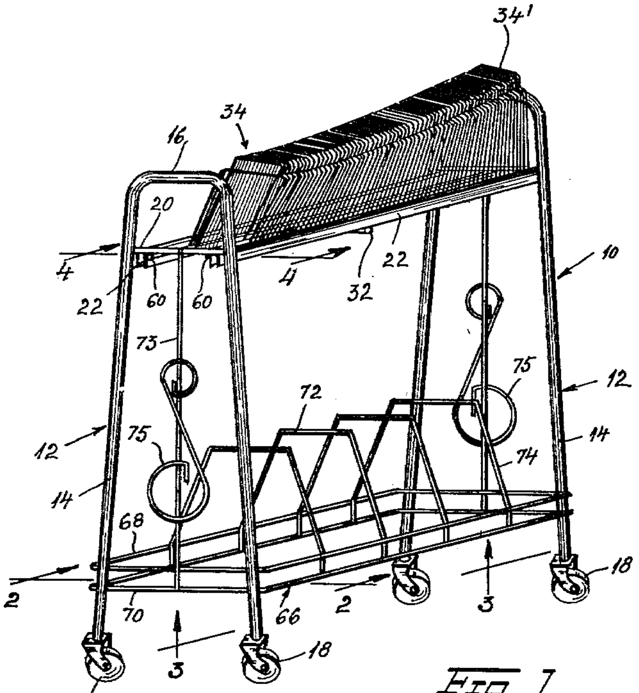
FIG. 1 is a perspective view of a phonograph disk record rack embodying one form of the invention.

Referring in detail to the drawings, a rack or holder for holding a plurality of phonograph records of the disk type, embodying one form of the invention, is shown in FIG. 1 and is designated generally by the reference numeral 10. This rack is of the type for supporting on a floor and rollable thereover. The rack 10 is substantially rectangular in plan and is formed of metal. The rack comprises a main frame consisting of end frame members 12, 12 of tubular metal, of inverted U-shape, the legs of which taper downwardly and outwardly from the bight portion 16 thereof. Casters or rollers 18 are fitted on the bottom ends of the legs for rolling the rack over a supporting surface. Bracing rods 20 of metal extend across the space between the legs 14 at the top of the frame members. A pair of inverted metal channel-shaped rails or bars 22 extend from frame member to frame member and are secured at their ends to the bottom surface of the bracing rods 20 by welding or the like. The rails are formed of sheet metal and have outer and inner side walls 24 and 26, respectively, and a top wall 28. A round wire rod 32 extends across the bottom edges of the rails midway the ends thereof to stiffen the rails.

Figure 6:
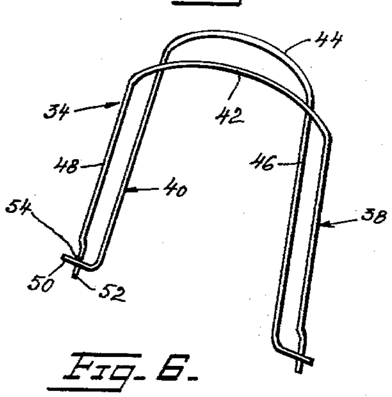
FIG. 6 is a perspective view of one of the phonograph record holding subframe units used in the rack.

A plurality of subframe units 34 for supporting a plurality of disk-shaped phonograph records 36 are hingedly secured to the channel rails 22. With particular reference to FIG. 6, each subframe unit 34 consists of a pair of nested inverted U-shaped wire rods or bails 38 and 40 of light stock. The bight portion 42 or wire rod 38 is straight and longer than the straight bight portion 44 of wire rod 40, and the leg portions 46 of wire rod 40 are straight and longer than the leg portions 48 of wire rod 38. The leg portions 46 of wire 40 are formed with laterally extending feet portions 50, and the leg portions 48 of wire rod 38 are formed with feet portions 52 offset from the plane of the leg portions 48. The offset feet portions 52 of wire rod 38 are preferably fastened to the laterally extending feet portions 50 of wire rod 40 by spot welding as indicated at 54.

Figure 4:
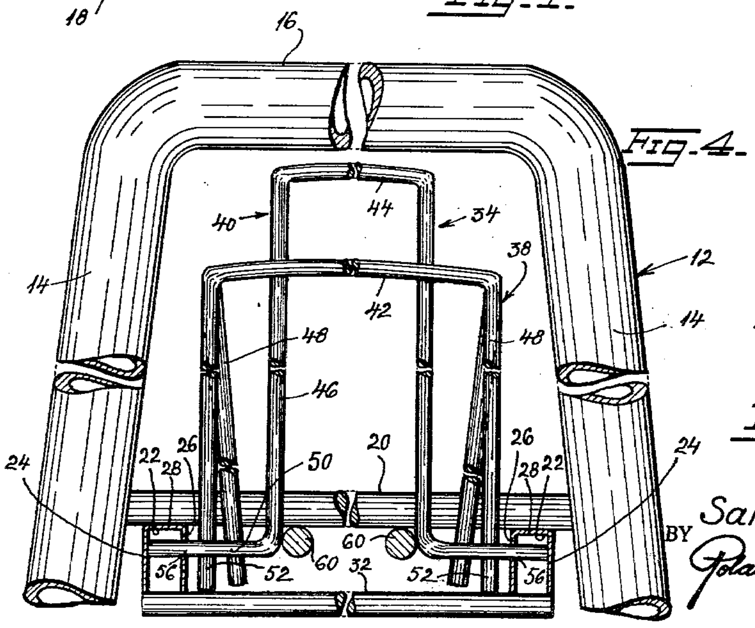
FIG. 4 is an enlarged vertical sectional view taken on the line 4—4 of FIG. 1, parts being shown broken away.

The inner walls 26 of the channel-shaped rails 22 are provided with a series of aligned socket bearing openings 56 so that the subframe units 34 are hingedly mounted in the channel-shaped rails 22 by journaling the extremities of the feet 50 of wire rods 40 in the socket openings 56 as seen in FIG. 4.

Figure 7:
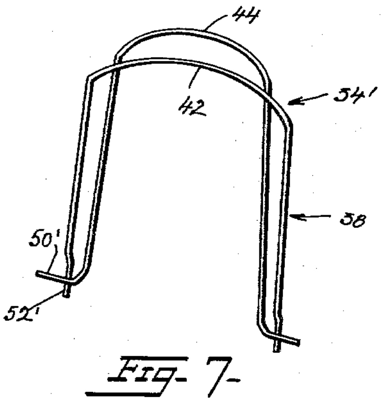
FIG. 7 is a similar view of another subframe unit used with the rack.
Figure 13:
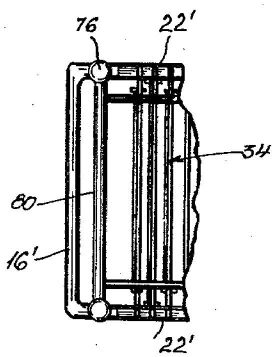
FIG. 13 is a fragmentary bottom plan view of the rack.
Figures 9, 10:
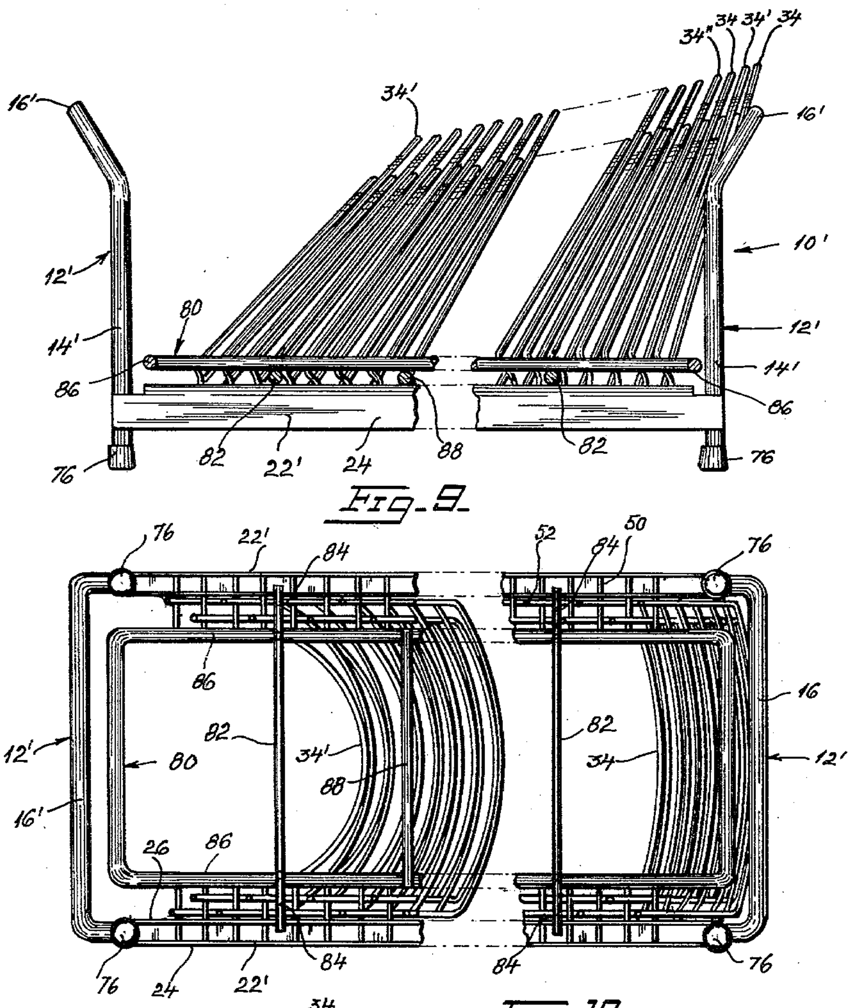
FIG. 9 is a side elevational view of a phonograph disk record rack embodying a modified form of the invention.
FIG. 10 is a bottom plan view thereof.
Figure 11:
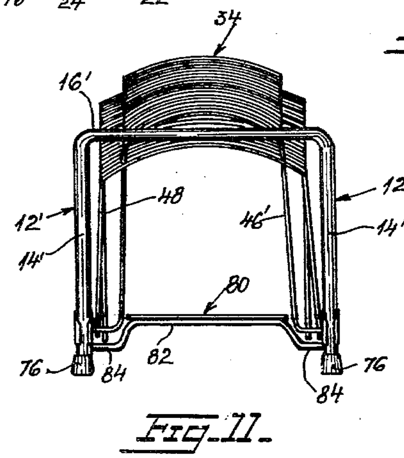
FIG. 11 is a front elevational view thereof.
Figure 12:
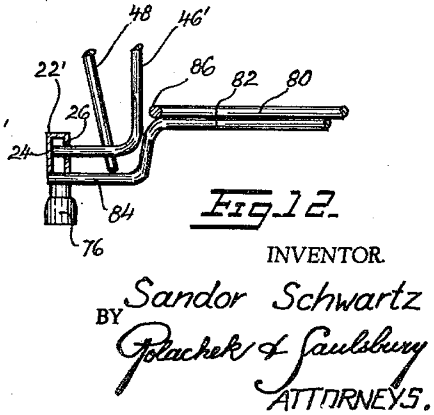
FIG. 12 is a fragmentary front elevational view of one corner of the rack.

It will be noted that in the subframe unit 34 shown in FIG. 6, the feet portions 52 of wire rod 38 extend across the feet portions 50 of wire rod 40 at points adjacent the outer ends of the feet portions 50, whereas in the subframe unit 34′ shown in FIG. 7, the feet portions 52′ extend across the feet portions 50′ at points adjacent the inner ends of feet portions 50′.

Figure 2:
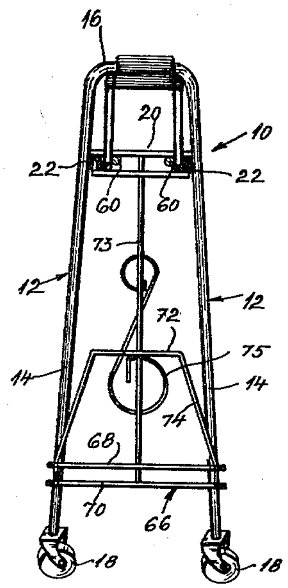
FIG. 2 is a vertical sectional view taken on the line 2—2 of FIG. 1.

As shown in FIG. 1 the subframes 34 and 34′ of FIGS. 6 and 7, respectively, are arranged alternately in the rack, starting with the frame 34′ of FIG. 7 at the right-hand side. By reason of this arrangement, the bight portions 44 of wire rod 40 are parallel, the bight portions 42 are parallel, and the legs 46 of wire rod 40 are parallel with each other, but the legs 48 of wire rod 38 form two aligned rows as seen in FIGS. 2 and 4. The bight portions 44 of wire rods 40 are arranged beyond the bight portions 42 of wire rods 38 and thus provide convenient handles for swinging the subframe units 34 and 34′.

The construction and arrangement of the wire rods 38 and 40 are such that the bight portion 42 of the wire rod 38 is wider than the bight portion 44 of the wire rod 40 and rests against the legs 46 of the wire rod 40 on one side thereof, whereas the offset feet portions 52 of the wire rod 38 are fastened to the feet portions 50 of the wire rod 40 at the other side of the leg portions 46 of wire rod 40 whereby due to the inherent springiness of the wire rods, the wire rods are spring-pressed against each other. The welded connections 54 of the wire rods serve as fulcrum points permitting a slight separation of the remainder of the wire rods away from each other so that a record 36 may be inserted therebetween.

An important feature of the present invention is means to prevent the subframe units 34 and 34′ from accidentally springing out of their journal bearings 56 in the rails 22, 22 when lateral pressure is exerted upon the legs of the subframe units. For this purpose, extending along the legs of the subframe units 34 and 34′, at the juncture thereof with the feet 50, there is positioned an elongated wire rod 60 of stout stock spaced laterally from said legs. The ends 62 of the rods 60 are offset from the bodies of the rods, extending around the end subframe unit 34 and the end subframe unit 34′ and are secured at the extremities thereof to the underside of the cross-bars 20, 20 by soldering or welding. The rods 60 are closely spaced from the bases of the legs of the subframe units and are disposed in the path of inward lateral movement of the legs of the subframe units so that the feet 50 of the wire rods 40 cannot spring out of the bearing openings 56 in the inner walls 26 of the rails 22, 22.

The invention also contemplates means for safely storing and easily selecting albums or books of records. An auxiliary frame 66 for this purpose is positioned adjacent the bottom of the legs 14 of the frame 12. This auxiliary frame consists of a pair of closely spaced superimposed endless wire upper and lower rails 68 and 70, respectively, rectangular in shape and secured adjacent the corners thereof to the legs 14. A plurality of upright inverted substantially U-shaped wire frames 72 are spaced along the rails 68, 70 and are secured thereto at the extremities of the legs 74 thereof by welding or soldering. Albums or books of records may be inserted between the frames 72 and supported on the top rail 68.

An upright wire rod 73 may extend between the cross bracing rod 20 and the rails 68, 70 at the centers thereof on each side of the main frame for supporting a wire member 75 embodying an ornamental design. The member 75 may be soldered or welded to the rod 73.

Figure 8:
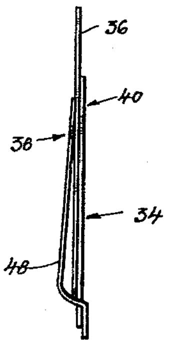
FIG. 8 is an edge view of one of the phonograph record holding subframe units used in the rack.
Figures 3, 5:
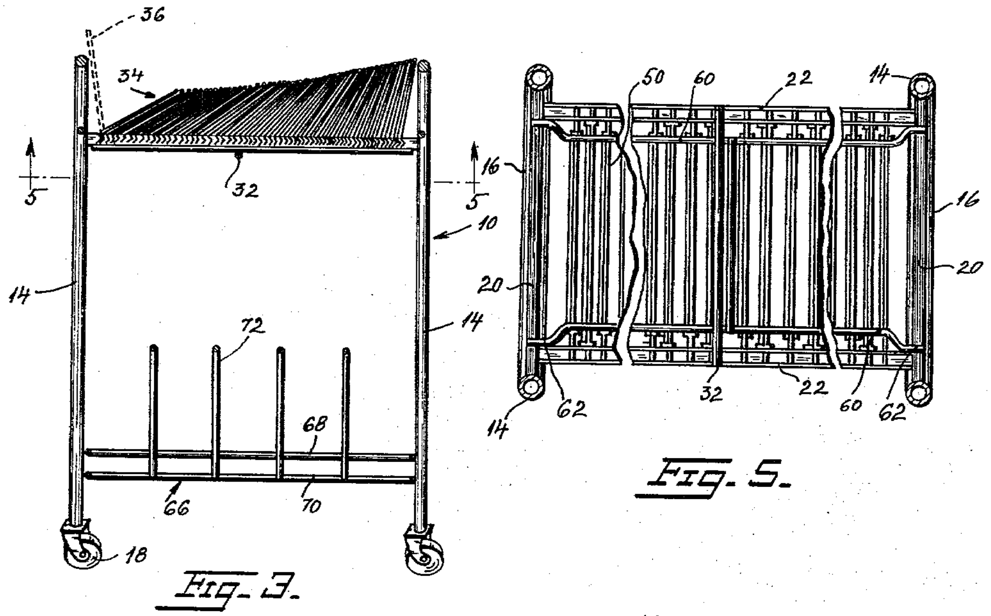
FIG. 3 is a vertical sectional view taken on the line 3—3 of FIG. 1, parts being shown omitted.
FIG. 5 is a sectional view taken on the line 5—5 of FIG. 3, parts being shown broken away.

In using the rack 10, a covered phonograph disk record 36 is mounted in a subframe unit 34 or 34′ by manually pushing the bight portions 42 and 44 thereof in opposite directions thereby separating the wire rods sufficiently to permit insertion of the record to the position shown in FIG. 8. The wire rods clamp the record in inserted position, wtih a peripheral portion of the record above the frame, which portion may contain data for identifying the record. The record rests upon the shoulders formed by the offset feet portions 52 of the legs 48 of wire rod 38. When the record is mounted in clamped position in the subframe unit 34 or 34′, the frame is swung toward one end of the rack into nested position with the other frames 34 and 34′. In order to remove a selected record, the subframe unit or units are swung to one side of the selected record to the opposite end of the rack and the wire rods 38 and 40 of the subframe unit containing the selected record are separated by pushing the wire rods in opposite directions permitting the record to be lifted out of the subframe unit. The subframe units are swingable to either end of the rack facilitating mounting and removal of the records. The end subframe units serve as abutments for supporting the swung subframe units.

Referring now to the modified form of rack 10′ shown in FIGS. 9 to 13, inclusive, this rack 10′ is of the type adapted to be supported on a desk or table top. The end frames 12′ are shorter than the end frames 12 with the bight portions 16′, 16′ offset outwardly from the plane of the legs 14′, 14′. Plastic caps 76 are mounted on the tips of the legs to protect the supporting surface. In this form, the rails 22′, 22′ are secured at their ends to the peripheries of the legs 14′, 14′.

The construction and arrangement of the rails 22′, 22′ and subframe units 34 and 34′ are similar to the rails 22, 22 and the subframe units 34 and 34′ of the rack 10.

A substantial difference between racks 10 and 10′, however, is in the construction, arrangement and mounting of the abutment means for preventing lateral displacement of the subframe units. This abutment means includes an endless rod 80, rectangular in shape, disposed in the space between the legs 46′ of the wire rods or bails 40 of the subframe units and extending from end to end of the rack. The rod 80 is mounted securely in position by means of a cross rod 82 having its ends 84 extending through holes in the inner wall 26 of the rails 22′, 22′ and having an offset portion intermediate its ends welded to the long sides 86, 86 of the rod 80. A brace bar 88 also extends across the space between the long sides 86, 86 of the rod 80 and is secured thereto at its ends for bracing the rod.

In all other respects, the rack 10′ is similar to rack 10 and similar reference numerals are used to indicate similar parts.

Figures 14, 15, 16:
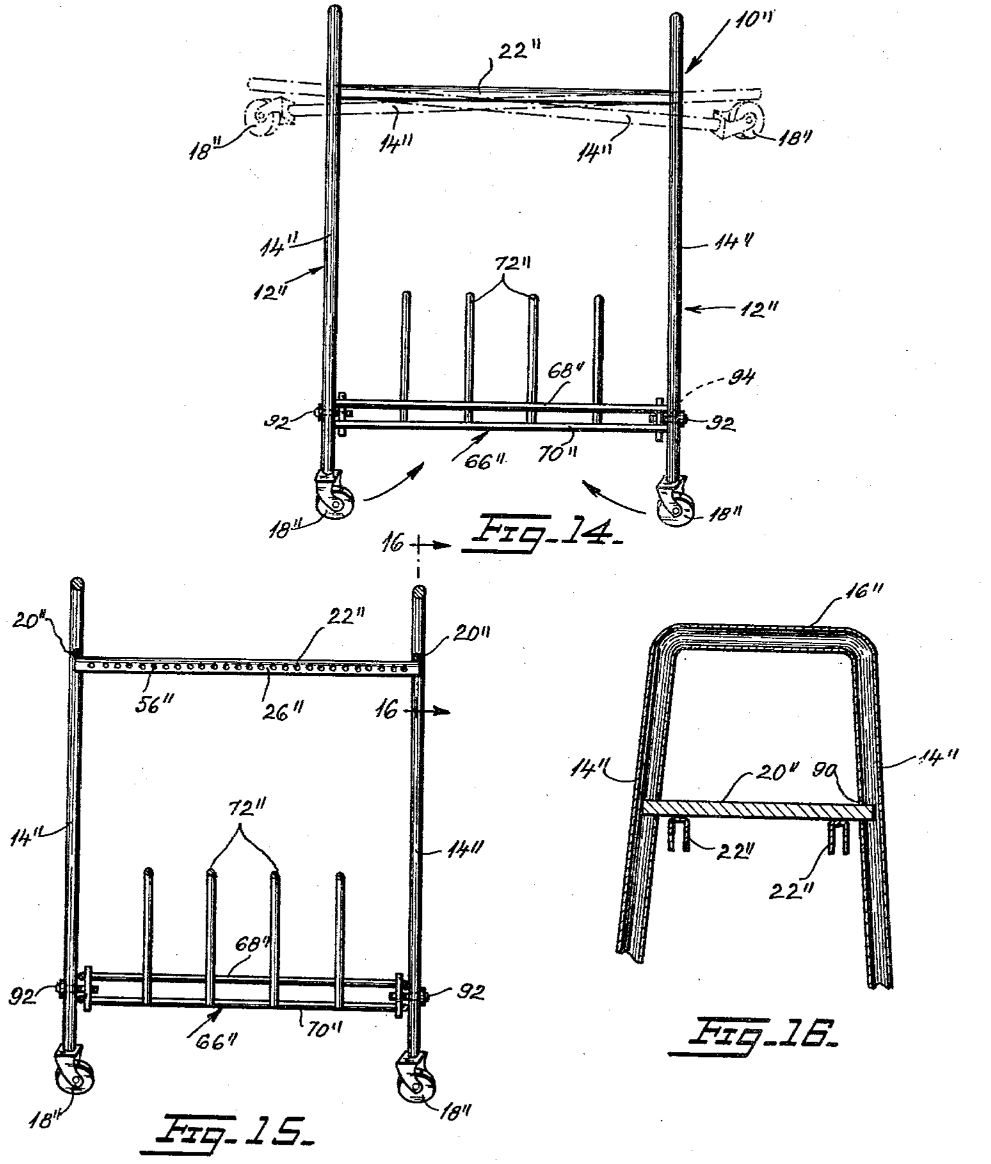
FIG. 14 is a view similar to FIG. 3 showing a still further modified form of phonograph disk record rack, showing the rack in collapsed condition in dot-dash lines.
FIG. 15 is a vertical sectional view taken through the center of the rack shown in FIG. 14.
FIG. 16 is an enlarged vertical sectional view taken on the line 16—16 of FIG. 15.

Referring to the modified form of rack 10″ shown in FIGS. 14 to 16, inclusive, in this form the bracing rods 20″ are fastened at their ends to the channel-shaped bars 22″ by welding or the like, with the extremities of their ends journalled in socket holes 90 in the legs 14″ of the end frames 12″.

Furthermore, the auxiliary frame 66″ for storing albums or books of records is removably mounted on the end frames 12″. This mounting comprises threaded bolts 92 extending through aligned threaded holes in the legs 14″ and holes 94 in the rails of the auxiliary frame. The channel-shaped bars 22″ are also formed with spaced holes therealong.

By reason of this construction, when the auxiliary frame 66″ is detached, the end frames 12″ can be swung toward each other in the direction of the arrows shown in FIG. 14 into nested collapsed condition as shown in dot-dash lines in FIG. 14.

Figures 17, 18, 19:
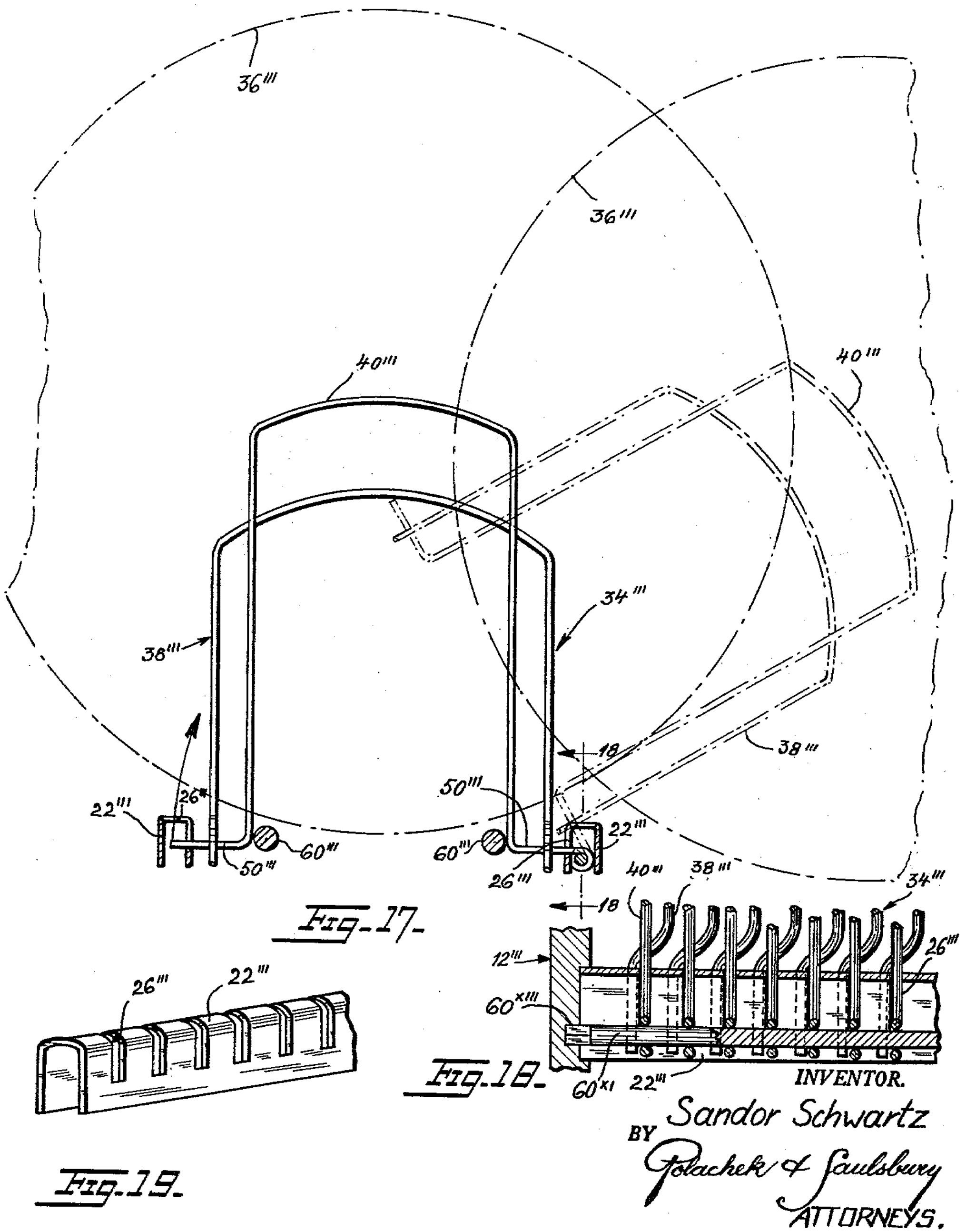
FIG. 17 is an enlarged fragmentary view similar to FIG. 4 of yet another modified form of the invention, showing a disk record supported in normal condition and supported in displaced condition in dot-dash lines.
FIG. 18 is an enlarged sectional view taken on the line 18—18 of FIG. 17.
FIG. 19 is an enlarged fragmentary perspective view of an inverted U-shaped rail of FIG. 17.

In the modified form of the invention shown in FIG. 17 to 19, inclusive, an elongated round rod $60^{x\prime}$, extends through one of the inverted U-shaped rails 22‴, with its square end $60^{x\prime\prime}$ seated in a similarly shaped socket hole in the adjacent end frame member 12‴ to keep the rod from turning. In this form, the subframe units 34‴ are hingedly and displaceably mounted on the rod $60^{x\prime}$. This mounting includes loops $50^{x\prime}$ formed on the ends of the feet 50‴ and looped loosely around the rod $60^{x\prime}$. The feet 50‴ extend through closed slots 26‴ formed in the channel rails 22‴. The slots permit the feet portions of the rod or bails 38‴ and 40‴ to tilt laterally, the feet portions riding in the slots, whereby the unit may be displaced laterally from the remainder of the units so that a record 36‴ may be readily removed from the unit or inserted therein and whereby the displacement indicates the particular record being used.

This for, the rods 60‴ that extend along the rails 22‴ keep the subframe units 34‴ from moving inwardly and at the same time serve as seats for the disk-shaped records 36‴.

The rack 10′ is to be supported on a flat horizontal surface, such as the top of a desk or table.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A rack for disk-shaped phonograph records comprising a rectangular-shaped frame including end frame members constituted by inverted U-shaped tubes, bracing bars secured to and across the legs of the tubes adjacent the top thereof, channel-shaped metal rails connected rigidly to the bottom surfaces of the bracing bars, a plurality of wire record-supporting subframe units hingedly connected to the channel-shaped metal rails, each unit constituted by a pair of inverted U-shaped wires connected at their bottom ends, one of said wires of the pair being narrower than the other, the bight portion of one wire arranged outwardly beyond the bight portion of the other wire, the outwardly arranged bight portions being parallel and serving as handles for manipulating the subframe units, the end frame members serving as abutments for the subframe units when the latter are swung from the vertical position, the hinge connection between the record-supporting frames and the channel-shaped metal rails constituting laterally extending feet portions on the legs of one wire rod of the subframe unit, said channel-shaped metal rails having a series of aligned socket openings in one wall thereof receiving said laterally extending feet portions, one of said U-shaped wires tapering inwardly from its connected end whereby its bight portion exerts a clamping action against a supported record, and means for preventing lateral displacement of the subframe units, said means comprising wire rods extending from end to end of the rack and secured to the bracing bars closely spaced from and between the legs of the narrower U-shaped wires, said frame having space for supporting albums of records below the subframe units.

References Cited by the Examiner

UNITED STATES PATENTS

| | | | |
|---|---|---|---|
| D. 122,172 | 8/40 | Robinson et al. | 211—181 X |
| D. 171,677 | 3/54 | Adler | 211—40 X |
| D. 180,955 | 9/57 | Lyons | 211—40 X |
| D. 190,587 | 6/61 | Magers | 211—41 X |
| 2,671,566 | 3/54 | Levy | 211—45 |
| 2,858,641 | 11/58 | Trimble | 108—20 X |
| 2,892,548 | 6/59 | Huff | 211—40 X |
| 2,956,685 | 10/60 | Levi | 211—40 |
| 2,992,745 | 7/61 | Huff | 211—40 X |

FOREIGN PATENTS

| | | |
|---|---|---|
| 110,293 | 4/44 | Sweden. |

FRANK L. ABBOTT, *Primary Examiner.*